United States Patent [19]
Dever et al.

[11] 3,773,711
[45] Nov. 20, 1973

[54] SUBSTITUTED 4,5-BENZO-1-OXA-3-THIA-2-PHOSPHOLANE

[75] Inventors: James L. Dever, Lewiston; Norman W. Dachs, Buffalo, both of N.Y.

[73] Assignee: Borg-Warner Corporation, Chicago, Ill.

[22] Filed: Nov. 23, 1970

[21] Appl. No.: 92,164

Related U.S. Application Data

[63] Continuation-in-part of Ser. No. 664,599, Aug. 31, 1967, abandoned.

[52] U.S. Cl.................. 260/937, 260/972, 260/973, 260/984, 260/985, 424/209
[51] Int. Cl.......... A01n 9/36, C07f 9/08, C07f 9/16
[58] Field of Search............................ 260/936, 937

[56] References Cited
UNITED STATES PATENTS
3,459,835   8/1969   Dever et al. .................... 260/937 X Primary Examiner—Lewis Gotts
Assistant Examiner—Richard L. Raymond
Attorney—William S. McCurry and Roger A. Schmiege

[57] ABSTRACT

The invention is directed to a compound of the formula:

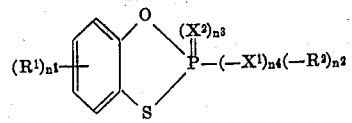

wherein $X^1$ is selected from the group consisting of oxygen, sulfur and nitrogen; $X^2$ is oxygen or sulfur; $R^1$ is alkyl, aryl, alkyl substituted by aryl and aryl substituted by alkyl; $R^2$ is alkyl, aryl, alkyl substituted by aryl and aryl substituted by alkyl or alkaryl; $n^1$ is from zero to two; $n^3$ is zero or one; $n^4$ is zero or one; $n^2$ is the valence of $X^1$ minus one when $n^4$ is 1; when $n^4$ is zero, $n^2$ is 1. The compound is useful as a chemical intermediate and as an insecticide.

21 Claims, No Drawings

SUBSTITUTED 4,5-BENZO-1-OXA-3-THIA-2-PHOSPHOLANE

CROSS REFERENCE TO RELATED APPLICATIONS

This case is a continuation-in-part of Ser. No. 664,599, filed Aug. 31, 1967, now abandoned.

BACKGROUND

In recent years, major advances have been made in the efficient production of mercaptophenols and substituted mercaptophenols. Accordingly, there is a continuing search for novel and useful compounds that can be prepared for mercaptophenols.

Similarly, although major advances have been made in recent years in the development of novel and efficient pesticidal compounds, there remains a great demand for the development of other novel insecticides having a high degree of effectiveness and a low toxicity to human beings.

Trivalent phosphorus esters of o-mercaptophenol are desirable because of their outstanding thermal and hydrolytic stability.

Accordingly, an object of this invention is a novel phosphorus compound.

Another object of this invention is a novel insecticide.

Another object of this invention is the process of use of the above novel compound as an insecticide.

Another object is an effective insecticidal composition.

Other objects become apparent from the preceding and following disclosure.

THE INVENTION

The invention is directed to a compound of the formula:

(1)
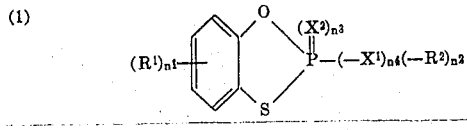

wherein $X^1$ is selected from the group consisting of oxygen, sulfur and nitrogen; $X^2$ is oxygen or sulfur; $R^1$ is alkyl, aryl, alkyl substituted by aryl and aryl substituted by alkyl; $R^2$ is alkyl, aryl, alkyl substituted by aryl and aryl substituted by alkyl or alkaryl; $n^1$ is from zero to two; $n^3$ is zero or one; $n^4$ is zero or one; $n^2$ is the valence of $X^1$ minus one when $n^4$ is 1; when $n^4$ is zero, $n^2$ is 1. The compound is especially useful as a chemical intermediate and as an insecticide.

When $n^3$ in the above generic formula is zero, whereby $X^2$ is not present, the compounds of the resulting formula are effective stabilizers for polymers such as polypropylene, polyethylene, acrylonitrile-butadiene-styrene copolymer, polystyrene, and other like compounds, a preferred group of compounds are those falling within the above formula when $n^3$ is zero and $X^1$ is oxygen.

When $n^3$ is 1 in the above generic formula, whereby $X^2$ is present, the compounds of the resulting formula are effective insecticides against the Mexican Bean Beetle (*Epilachna varivistis Muls.*), black bean aphids (*Aphis fabae Scop.*), and the like; the preferred compound against these insects being compounds in which $X^2$ is sulfur, $X^1$ is oxygen, and $R^2$ is alkyl, preferably, ethyl.

Preferred compounds in which $n^3$ is zero, having generally good bactericidal properties are those compounds in which $X^1$ is oxygen and $R^2$ is (1) an alkyl such as ethyl or methyl, preferably methyl, or (2) aryl such as phenyl.

Other subgeneric formula which this invention is directed to are:

(2)
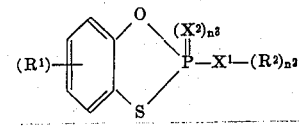

wherein $n^2$ is equal to the valence of $X^1$ minus 1; and $n^1$, $n^3$, $R^1$, $R^2$, $X^1$ and $X^2$ are defined in formula 1 and (3)
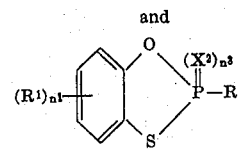

wherein $n^1$, $n^3$, $R^1$, $R^2$ and $X^2$ are as defined in formula 1.

Some compounds representative of the above generic formula typically include: 2-methoxy-2-thio-4,5-benzo-1-oxa-3-thia-2-phospholane; 2-ethoxy-2-thio-4,5-benzo-1-oxa-3-thia-2-phospholane; 4,5-benzo-2-methoxy-1-oxa-3-thia-2-phospholane; 4,5-benzo-2-methoxy-2-oxo-1-oxa-3-thia-2-phospholane; 2-ethoxy-2-oxo-4,5-benzo-1-oxa-3-thia-2-phospholane; 2-methyl-4,5-benzo-1-oxa-3-thia-2-phospholane; 2-methyl-2-thio-4,5-benzo-1-oxa-3-thia-2-phospholane; 2-phenoxy-4,5-benzo-1-oxa-3-thia-2-phospholane; 2-phenyl-2-oxo-4,5-benzo-1-oxa-3-thia-2-phospholane; 2-phenoxy-2-thio-4,5-benzo-1-oxa-3-thia-2-phospholane; 2-dimethylamino-2-thio-4,5-benzo-1-oxa-3-thia-2-phospholane; 2-mercaptodecyl-4,5-benzo-1-oxa-3-thia-2-phospholane; 2-mercaptododecyl-4,5-benzo-1-oxa-3-thia-2-phospholane; 2-phenoxy-4,5-benzo-1-oxa-3-thia-2-phospholane; 2-decyloxy-4,5-benzo-1-oxa-3-thia-2-phospholane; 2-(nonylphenoxy)-4,5-benzo-1-oxa-3-thia-2-phospholane; 2-(p-t-butylphenoxy)-4,5-benzo-1-oxa-3-thia-2-phospholane; 2-dimethylamino-4,5-benzo-1-oxa-3-thia-2-phospholane; 2-(2,6-di-isopropylphenoxy)-4,5-benzo-1-oxa-3-thia-2-phospholane; 2-(2,4-di-t-butylphenoxy)-4,5-benzo-1-oxa-3-thia-2-phospholane; 2-(2,6-dimethylphenoxy)-4,5-benzo-1-oxa-3-thia-2-phospholane; 2-[(1-phenylethyl)phenoxy]-4,5-benzo-1-oxa-3-thia-2-phospholane; 2-(2,6-di-*sec*-butylphenoxy)-4,5-benzo-1-oxa-3-thia-2-phospholane; 2-(2,4-di-*sec*-amylphenoxy)-4,5-benzo-1-oxa-3-thia-2-phospholane; and 2-(octylphenoxy)-4,5-benzo-1-oxa-3-thia-2-phospholane.

Emulsifiable concentrates of compounds of present invention may be prepared according to known art; hence, the active component such as 2-phenoxy-4,5-benzo-1-oxa-3-thia-2-phospholane, is dissolved in an appropriate hydrocarbon solvent such as toluene or xylene to which is added either one or more emulsifying agents such as Emcol H-300 and/or Emcol H-500; each of these typical commercial emulsifying agents being blends of anionic and non-ionic emulsifiers designed for preparing emulsifiable concentrates of agricultural chemicals. The amount of emulsifying agent(s) added will depend on some extent to the degree of hardness present in the water to which the emulsifiable concentrate is to be added. A specific example of an emulsifiable concentrate composition is as follows:

| Component | Parts |
|---|---|
| 2-phenoxy-4,5-benzo-1-oxa-3-thia 2-phospholane | 24 |
| Emcol H-500 | 1.6 |
| Emcol H-300 | 1.6 |
| Xylene | 48.0 |

The compounds of this invention may be prepared using any of several classical methods known to those skilled in the art. Typical methods follow.

1. The mercaptophenols employed as starting materials for the subject compounds may be reacted with sodium hydroxide or other strong bases such as sodium alkoxides, sodium metal, sodium hydride, etc. to produce their disodium salts. These in turn, may be reacted with phosphorochloridates, phosphorochloridites, phosphonochloridates, phosphoramidic chlorides, etc., in a suitable solvent to produce the compounds of this invention

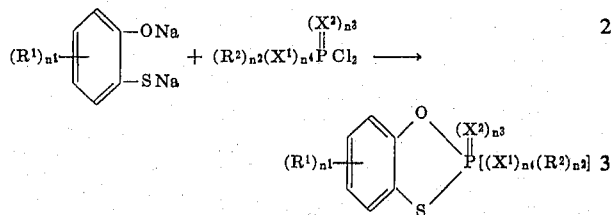

where the formulae are defined above.

2. The trivalent members of the subject compounds may be produced by reacting 4,5-benzo-2-halo-1-oxa-3-thia-2-phospholane with a suitable active hydrogen in the presence of an organic tertiary amine, such as triethylamine, as an HCl acceptor. This reaction is carried out in an inert solvent and, after work-up procedures well known to those skilled in the art, the subject compounds are obtained.

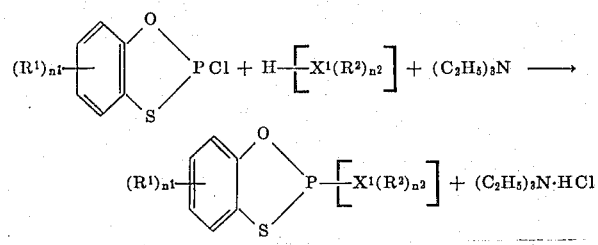

where the formulae are defined above.

3. The trivalent ($n^3 = 0$) members of the subject compounds may be converted to the corresponding thionophosphates ($X^2$ = sulfur; $n^3 = 1$) by reaction with an equivalent of elemental sulfur at temperatures ranging from 10° to 125°C. This reaction is well known in the art

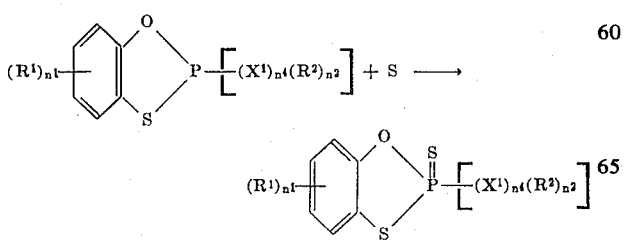

where the formulae are defined above.

An alternative typical process of copending application Ser. No. 664,611, filed Aug. 31, 1967, now U.S. Pat. No. 3,574,797 consists of heating a phenolic to about 50°C to about 250°C, preferably about 130°C to about 180°C and promptly thereafter adding about an equimolar amount of typically 4,5-benzo-2-halo-1-oxa-3-thia-2-phospholane (a compound described in copending application Ser. No. 645,873, filed June 14, 1967 now U.S. Pat. No. 3,522,331), or substituted forms thereof, while maintaining the temperature in the above-indicated range. At temperatures above about 180°C, a higher degree of degradation occurs in direct proportion to increase in temperature. When a phenolic reactant having a relatively low boiling point is employed, a lower reaction temperature should be employed. After addition of the phospholane, in this process, the reaction temperature is preferably maintained until reaction is substantially complete as evidenced by cessation of the evolution of hydrogen chloride. After an appropriate reaction period of about 1 to about 10 hours, preferably about 2 to about 3 hours, the mixture consists of essentially pure novel compound of this invention. If higher purity is required the reaction product may be distilled under vacuum. This process is advantageous in that it does not require the use of a base, requires no refrigeration, uses about equimolar amounts of reactants, and proceeds in high conversions.

Some of the starting ortho mercapto phenols that can be used in preparing the compounds of the invention are ortho mercapto phenol; 3,5-di-butyl ortho mercapto phenol; 3-methyl or 3,5-dimethyl ortho mercapto phenol; 3-dodecyl or 3,5-didodecyl ortho mercapto phenol; 3-hexyl or 3,5-dihexyl ortho mercapto phenol; 3-benzyl or 3,5-dibenzyl ortho mercapto phenol; 3-naphthyl or 3,5-dinaphthyl ortho mercapto phenol; 3-(2-methylphenyl) or 3,5-bis(2-methyl phenyl)ortho mercapto phenol; 3-phenyl or 3,5 diphenyl ortho mercapto phenol.

Some of the

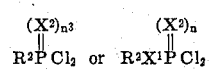

that may be used in the reaction with the disodium salt of ortho mercapto phenol are

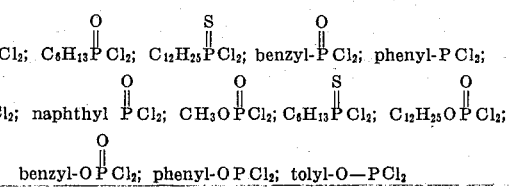

Some of the hydroxyl or mercaptan containing compounds that may be used in the reaction with 4,5-benzo-2-halo-1-oxa-3-thia-phospholane are phenol; thiophenol; o, m or p- cresol; 3, or 3,5-tolyl phenol; naphthol; methanol; butanol; hexanol; dodecanol; 3-phenyl propanol; 4-phenyl butanol; 6-phenylhexanol.

In the above generic formula it is preferred that $R^1$ not be present; when present it is preferred that $R^1$ be up to 12 carbon atoms and even more preferably up to six carbon atoms; such as phenyl, or lower alkyl, such as methyl or ethyl.

$R^2$ is preferably (a) alkyl, (b) aryl, (c) alkyl substituted by aryl or (d) aryl substituted by alkyl or alkaryl wherein aryl is phenyl or naphthyl and alkyl is up to 12 carbon atoms; the substituents on the aryl are alkyl of up to 12 carbon atoms and alkyl of one to four carbon atoms substituted by phenyl. The substituents of any of the aryl rings range from zero to two, inclusive.

Another preferred embodiment is when $R^2$ is a disubstituted phenyl wherein the substituents are lower alkyl, preferably methyl, ethyl or t-butyl.

The following Examples are intended to illustrate the invention and do not limit the invention except to the extent that the appended claims are limited or as otherwise stated. In the following Examples, all percentages are by weight, and temperatures are expressed in degrees centigrade unless otherwise stated.

EXAMPLE I 25.2 g of o-mercaptophenol was dissolved in 250 ml of c.p. benzene and to it was added 26.2 g (0.2 m) ethyl phosphorodichloridite over a period of 15 minutes. The reaction mixture was heated with stirring at reflux for 24 hours, cooled and the solvent removed under reduced pressure. The product, 2-ethoxy-4,5-benzo-1-oxa-3-thia-2-phospholane, was isolated as a yellow-amber liquid.

Anal.: Cal'd for $C_8H_9O_2PS$: %P, 15.5; %S, 17.36
Found: %P, 14.8; %S, 16.72

EXAMPLE II 20 g 2-ethoxy-4,5-benzo-1-oxa-3-thia-2-phospholane, 32 g elemental sulfur and 100 ml c.p. benzene was stirred at room temperature for 24 hours. The mixture was filtered and the benzene removed under vacuum. 20 g of 2-ethoxy-2-thia-4,5-benzo-1-oxa-3-thia-2-phospholane was obtained as a light orange liquid.

Anal.: Cal'd for $C_8H_9O_2PS_2$: %P, 13.34; %S, 20.0
Found: %P, 13.34; %S, 20.1

EXAMPLE III 13 g o-mercaptophenol were dissolved in 200 ml benzene and to it was added 18.6 g of methyl phosphorodichloridite. The reaction mixture was heated for 42 hours at reflux. The products were washed with water, dried over anhydrous magnesium sulfate and the solvent removed. The product was a water-white liquid and weighed 16.1 g. The product obtained was 4,5,-benzo-2-methoxy-1-oxa-3-thia-2-phospholane.

Anal.: Cal'd for $C_7H_7O_2PS$: %P, 17.20; %S, 16.6
Found: %P, 17.9; %S, 14.4

EXAMPLE IV 9.3 g of product obtained in Example III, 100 ml benzene and 1.6 g elemental sulfur were stirred 20 hours at room temperature. The solids were filtered from the product and the filtrate was evaporated under vacuum to yield 10.2 g (97 percent) of a pale yellow liquid. The product obtained was 4,5-benzo-2-methoxy-2-thio-1-oxa-3-thia-2-phospholane.

Anal.: Cal'd for $C_7H_7O_2PS_2$: %P, 14.3; %S, 29.4
Found: %P, 12.5; %S, 29.9

EXAMPLE V 13.0 g of o-mercaptophenol were dissolved in 200 ml benzene and to this solution was added 19.5 g phenyl phosphorodichloridite. The reaction mixture was heated at reflux for 40 hours and cooled to room temperature. The solution was washed with water, dried over anhydrous magnesium sulfate and the solvents removed under vacuum. Collected 24.2 g (97 percent) of light-yellow liquids. The product obtained was 2-phenoxy-4,5-benzo-1-oxa-3-thia-2-phospholane.

Anal.: Cal'd for $C_{12}H_9O_2PS$: %P, 12.4; %S, 12.9
Found: %P, 11.7; %S, 11.8

EXAMPLE VI

To 43.7 g decyl mercaptan, 30.4 g triethylamine and 150 ml tetrahydrofuran, cooled to 10°C was added 47.7 g 2-chloro-4,5-benzo-1-oxa-3-thia-2-phospholane dropwise over 0.5 hours. After stirring for 0.5 hours, the mixture was filtered, solvent removed and the residue distilled at 0.02 mm Hg. Collected 54.6 g of a water-white liquid b.p. 153–155 at 0.02 mm Hg. The product obtained was 2-mercaptodecyl-4,5-benzo-1-oxa-3-thia-2-phospholane.

Anal.: Cal'd for $C_{16}H_{25}OPS_2$: C, 58.5; H, 7.7; P, 9.4; S, 19.5
Found: C, 58.5; H, 7.8; P, 9.3; S, 19.4

EXAMPLE VII

A solution of 18.9 g phenol, 23.3 g triethylamine and 100 ml of tetrahydrofuran was cooled to 10°–20°C in an ice bath. To this solution was added 38.1 g 2-chloro-4,5-benzo-1-oxa-3-thia-2-phospholane dropwise over 0.5 hours. The reaction mixture was filtered after 0.5 hour and the solvent removed. Distilled, the product at 112°–113.5°C and 0.15 mm, collected 32.7 g of water-white liquid. The product obtained was 2-phenoxy-4,5-benzo-1-oxa-3-thia-2-phospholane.

Anal.: Cal'd for $C_{12}H_9O_2PS$: C, 58.1; H, 3.7; P, 12.5; S, 12.9
Found: C, 58.3; H, 3.9; P, 12.8; S, 13.1

EXAMPLE VIII 28.6 g 2-chloro-4,5-benzo-1-oxa-3-thia-2-phospholane was added dropwise in 0.5 hour to a solution of 18.2 g triethylamine, 23.7 g n-decylalcohol in 150 ml tetrahydrofuran maintaining the temperature below 35°C. After stirring 0.5 hour, the mixture was filtered, the solvent removed at reduced pressure. The residue was distilled at 0.03–0.06 mm Hg. The product was collected at 132°–135°C and weighed 30.1 g. The product obtained was 2-decyloxy-4,5-benzo-1-oxa-3-thia-2-phospholane.

Anal.: Cal'd for $C_{16}H_{25}O_2PS$: C, 61.5; H, 8.1; P, 9.9; S, 10.3
Found: C, 61.7; H, 8.1; P, 9.9; S, 10.3

EXAMPLE IX

To a solution of 110.1 g nonylphenol, 65.8 triethylamine and 300 ml tetrahydrofuran cooled at 5°–10°C., with ice, was added, dropwise, 95.3 g 2-chloro-4,5-benzo-1-oxa-3-thia-2-phospholane over 0.5 hour. After stirring for 1.0 hour the mixture was filtered and the solvent removed under vacuum. The residue was distilled, collected 105.5 g of water-white liquid b.p. 0.1 mm 177°–180°C The product obtained was 2(-nonylphenoxy-)4,5-benzo-1-oxa-3-thia-2-phospholane.

Anal.: Cal'd for $C_{21}H_{27}O_2PS$: C, 67.4; H, 7.3; P, 8.3; S, 8.6
Found: C, 67.4; H, 7.4; P, 8.3; S, 8.6

EXAMPLE X

To 75.1 g p-tert-butylphenol, 65.8 triethylamine and 300 ml tetrahydrofuran at 5°–15°C was added dropwise, during 0.5 hour, 95.3 g 2-chloro-4,5-benzo-1-oxa-2-thia-2-phospholane. The mixture was filtered after 0.5 hours, solvent removed under vacuum and the residue distilled. Collected 98.9 g of water-white liquid b.p. 0.07–0.2 mm Hg 137°–142°C. The product obtained was 2(-p-t-butylphenoxy-)4,5-benzo-1-oxa-3-thia-2-phospholane.

Anal. : Cal'd for $C_{16}H_{17}O_2PS$ : C, 63.0; H, 5.7; P, 10.2; S, 10.5
Found : C, 63.2; H, 5.8; P, 10.1; S, 10.4

EXAMPLE XI

Dissolved 12.6 g o-mercaptophenol in 50 ml absolute methanol and to this was added 11.4 g sodium methylate dissolved in 50 ml absolute methanol. The addition time was 15 minutes and the temperature maintained at 35°C. After the addition was complete, the methanol solvent was removed under reduced pressure. The resultant yellow solids were dissolved in 215 ml dioxane at 60°C and a solution of 17.9 g ethylphosphorodichloridate in 100 ml dioxane added in 15 minutes. The reaction mixture was heated at 80°C for 3 hours, cooled and filtered. After removal of dioxane, the product, 2-ethoxy-2-oxo-4,5-benzo-1-oxa-3-thia-2-phospholane was an amber colored liquid

EXAMPLE XII

Following the procedure described in EXAMPLE I, but substituting 0.2 m methyl phosphorus dichloride for 0.2 m of ethylphosphorodichloridite, the 2-methyl-4,5-benzo-1-oxa-3-thia-2-phospholane was obtained as a colorless liquid.

EXAMPLE XIII

Following the procedure described in EXAMPLE II, but substituting 0.2 m 2-methyl-4,5-benzo-1-oxa-3-thia-2-phospholane for 0.2 m 2-ethoxy-4,5-benzo-1-oxa-3-thia-2-phospholane, the 2-methyl-2-thio-4,5-benzo-1-oxa-3-thia-2-phospholane was obtained as a pale yellow solid.

EXAMPLE XIV

Following the procedure described in EXAMPLE I, but substituting 0.2 m phenyl phosphorus dichloride for 0.2 m ethyl phosphorodichloridite, the 2-phenyl-4,5-benzo-1-oxa-3-thia-2-phospholane was obtained as a water-white liquid.

EXAMPLE XV

Following the procedure described in EXAMPLE I, but substituting 0.2 m phenyl phosphonodichloridite for 0.2 m ethyl phosphorodichloridite, the 2-phenoxy-4,5-benzo-1-oxa-3-thia-2-phospholane was obtained, as a pale yellow liquid.

EXAMPLE XVI

Utilizing the phospholane obtained in EXAMPLE XV and following the procedure described in EXAMPLE II, the 2-phenoxy-2-thio-4,5-benzo-1-oxo-3-thia-2-phospholane is obtained.

EXAMPLE XVII 9.5 g 2-chloro-4,5-benzo-1-oxa-3-thia-2-phospholane was dissolved in 100 ml c.p. benzene and added dropwise to a cooled solution of 4.95 g dimethylamine dissolved in 40 ml benzene. The temperature was maintained between 5°–15°C. The mixture was stirred for 18 hours and filtered. The filtrates were evaporated in a steam bath and there was obtained 8.8 g of a light-green liquid. The product obtained was 2-dimethylamino-4,5-benzo-1-oxa-3-thia-2-phospholane.

Anal. : Cal'd for $C_8H_{10}OPNS$ : %P, 15.54; %N, 7.02; %S, 16.06
Found : %P, 15.40; %N, 6.72; %S, 16.19

EXAMPLE XVIII

Utilizing the product of EXAMPLE XVII and following the procedure described in EXAMPLE II, 2-dimethylamine-2-thio-4,5-benzo-1-oxa-3-thia-2-phospholane was obtained.

EXAMPLE XIX 2-(2,6-DI-ISOPROPYL PHENOXY)-4,5-BENZO-1-OXA-3-THIA-2-PHOSPHOLANE

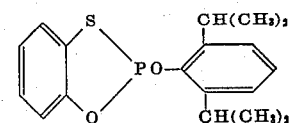

A 250 ml flask was charged with 2,6-di-iso-propyl phenol, 89.2 g (0.5 mole). This was heated to 160°C under $N_2$ and 95.3 g ( 0.5 mole) of BCOTP (i.e., 4,5-benzo-2-chloro-1-oxa-3-thia-2-phospholane) was added dropwise in 0.45 hour at 155°–160°C. After heating an additional hour at 155°C, the mixture was cooled under vacuum and the residue distilled to give 153.9 g (93 percent conv.) of clear, colorless product, b.p. 135°–137° at 0.05 mm having the following analysis:

Anal. : Cal'd for $C_{18}H_{21}O_2PS$ : C, 65.1; H, 6.4; P, 9.3; S, 9.7
Found : C, 65.3; H, 6.4; P, 9.5; S, 9.0

EXAMPLE XX 2-(2,4-DI-T-BUTYLPHENOXY)4,5-BENZO-1-OXA-3-THIA-2-PHOSPHOLANE

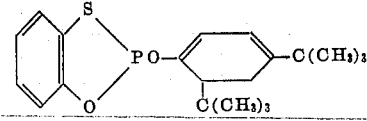

A 250 ml flask was charged with 103.2 g (0.5 mole) of 2,4-di-t-butyl phenol. This was heated to 160°C under $N_2$ and then 95.3 g (0.5 mole) of BCOTP was added dropwise in 0.65 hour at 160–165°C. After heating one hour at 165°, the mixture was cooled under vacuum and distilled to give 165.9 g (92 percent conv.) of clear, colorless product, b.p. 143°–147° at 0.2–0.05 mm, having the following analysis:

Anal. : Cal'd for $C_{20}H_{25}O_2PS$ : C, 66.6; H, 7.0; P, 8.6; S, 8.9
Found : C, 66.5; H, 6.9; P, 8.6; S, 9.1

EXAMPLE XXI 2-(2,6-DIMETHYLPHENOXY)-4,5-BENZO-1-OXA-3-THIA-2-PHOSPHOLANE

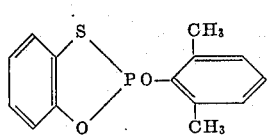

A 250 ml flask was charged with 73.3 g (0.6 mole) of 2,6-dimethylphenol. This was heated to 160° under $N_2$ and 111.4 g (0.6 mole) of BCOTP was added dropwise in 0.5 hour at 155°–165°. After heating 2 hours at 160°, the mixture was cooled under vacuum and distilled to give 149.3 g (90 percent conversion) of clear, colorless product, b.p. 114°–115° at 0.05 mm, having the following analysis:

Anal. : Cal'd for $C_{14}H_{13}O_2PS$ : C, 60.8; H, 4.8; P, 11.2; S, 11.6

Found : C, 61.4; H, 4.8; P, 11.5; S, 11.0

EXAMPLE XXII

2-[(1-PHENYLETHYL)PHENOXY]-4,5-BENZO-1-OXA-3-THIA-2-PHOSPHOLANE

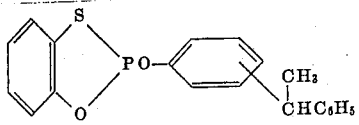

A 500 ml flask was charged with 146.9 g (0.74 mole) of monostyrenated phenol. This was heated to 165° under $N_2$ and 141.0 g (0.74 mole) of BCOTP was added dropwise in 0.7 hour at 160°–165°. After heating 2 hours at 160° the mixture was cooled under vacuum and distilled to give 216.3 g (83 percent conversion) of clear, colorless product, b.p. 172°–175° at 0.05 mm, having the following analysis:

Anal. : Cal'd for $C_{20}H_{17}O_2PS$ : C, 68.1; H, 4.9; P, 8.8; S, 9.1

Found : C, 68.0; H, 4.9; P, 8.8; S, 9.3

EXAMPLE XXIII

2-PHENOXY-4,5-BENZO-1-OXA-3-THIS-2-PHOSPHOLANE

A 500 ml flask was charged with 94.1 g (1.0 mole) of phenol. This was heated to 145° under $N_2$ and 190.6 g (1.0 mole) of BCOTP was added dropwise in one hour at 14°–145°. After heating two hours, the mixture was cooled under vacuum and distilled to give 209.4 g (84 percent conversion) of clear, colorless product, b.p. 172°–175° at 0.04 mm, having the following analysis:

Anal. : Cal'd for $C_{12}H_9O_2PS$ : P, 12.5; S, 12.9

Found : P, 12.5; S, 12.7

EXAMPLE XXIV

2-(2,6-SEC-BUTYLPHENOXY)-4,5-BENZO-1-OXA-3-THIA-2-PHOSPHOLANE

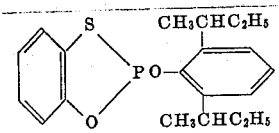

A 500 ml flask was charged with 154.7 g (0.75 mole) of 2,6-di-sec-amyl phenol. This was heated to 160° under $N_2$ and 143.0 g (0.75 mole) of BCOTP was added dropwise in 0.7 hour at 155°–160°. After heating 2 hours at 160°–165°, the mixture was cooled under vacuum and distilled to give 240.5 g (89 percent conversion) of clear, colorless product, b.p., 142°–144° at 0.05 mm, having the following analysis:

Anal. : Cal'd for $C_{20}H_{25}O_2PS$ : P, 8.6; S, 8.9

Found : P, 8.7; S, 8.9

EXAMPLE XXV

2-(2,4-DI-SEC-AMYLPHENOXY)-4,5-BENZO-1-OXA-3-THIA-2-PHOSPHOLANE

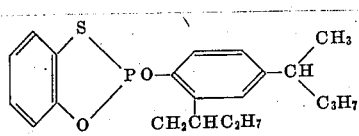

A 500 ml flask was charged with 156.2 g (0.6 mole) of 2,4-di-sec-amylphenol. This was heated to 155° under $N_2$ and 127.1 g (0.67 mole) of BCOTP was added dropwise in 0.5 hour at 150°–160°. After heating at 160°–170° for 2 hours, cooled under vacuum and distilled to give 230.5 g (89 percent conversion) of clear, colorless product, b.p. 152°–155° at 0.05 mm, having the following analysis:

Anal. : Cal'd for $C_{22}H_{29}O_2PS$ : P, 8.0; S, 8.3

Found : P, 8.0; S, 8.3

EXAMPLE XXVI

2-(OCTYLPHENOXY)-4,5-BENZO-1-OXA-3-THIA-2-PHOSPHOLANE

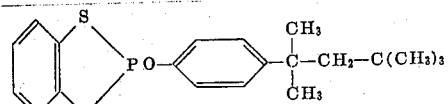

A 500 ml flask was charged with 154.8 g (0.75 mole) of octylphenol. This was heated to 160° under $N_2$ and then 143.0 g (0.75 mole) of BCOTP was added dropwise in 0.6 hour at 155°–160°, cooled under vacuum, and distilled to give 238.6 g (89 percent conversion) of clear, colorless product, b.p. 169°–173° at 0.25–0.2 mm, having the following analysis:

Anal. : Cal'd for $C_{20}H_{25}O_2PS$ : P, 8.6; S, 8.9

Found : P, 8.5; S, 8.9

EXAMPLE XXVII

For various miscellaneous compounds of this invention, tests were conducted and the results thereof illustrate the utility of the compounds as stabilizers for polymers such as polypropylene.

The data supporting this utility was obtained using a Brabender Plasticorder which is widely accepted in the plastics industry as a laboratory duplicator of plastics plant processing. This instrument graphs changes in torque of a polymer melt with time under processing conditions. The torque is directly related to the viscosity of the polymer melt. Changes in viscosity have long been used as an indication of polymer degradation. When degradation occurs by cross-linking the viscosity and torque increase with degradation and when degradation occurs by chain breaking, the viscosity and torque decrease with degradation. In the case of polypropylene, the torque decreases with degradation as evidenced by the values indicated in the attached table of results where no stabilizer was added. Initially, the torque was 760 meter-grams and after 15 minutes, had dropped to 105 m-g. All the readings in the table are 15 minute readings because they offered the most convenient comparison point with unstabilized polypropylene. All values in the table were obtained using an EH-6 measuring head with mixing set at 100 RPM and a bowl temperature of 190°C. The stabilizer was added at a 1 percent load level to unstabilized polypropylene and the mixture pre-blended before introduction to the mixing bowl. The results are illustrated in the following Table I, for the stabilization of polypropylene with

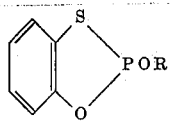

TABLE I

| R value | 15-minute torque reading (meter-G) |
|---|---|
| No stabilizer (control) | 105 |
| ![structure: 2,6-dimethylphenyl] -C$_6$H$_3$(CH$_3$)$_2$ with CH$_3$, CH$_3$ | 675 |
| ![structure] with CH$_3$CHC$_2$H$_5$, CH$_3$CHC$_2$H$_5$ | 615 |
| ![structure] with -C(CH$_3$)$_3$, C(CH$_3$)$_3$ | 625 |
| ![structure] -C$_9$H$_{19}$ | 710 |
| ![structure] with CH$_3$, -CHC$_6$H$_5$ | 675 |
| ![structure unsubstituted] | 740 |
| ![structure] -C(CH$_3$)$_3$ | 640 |
| ![structure] -C(CH$_3$)$_2$-CH$_2$C(CH$_3$)$_2$-CH$_3$ | 660 |
| ![structure] with CH(CH$_3$)$_2$, CH(CH$_3$)$_2$ | 635 |

EXAMPLE XXVIII

For various miscellaneous compounds of this invention, tests were conducted and the results illustrate the utilities as bactericides, and insecticides, as follow.

For the following illustrated test results, the abbreviations are employed as shown in Table II.

Compound II ethyl thiocatechol (cyclic) phosphite
    [(C$_6$H$_4$OS)P — O — C$_2$H$_5$]
Compound III methyl thiocatechol (cyclic) phosphite
    [(C$_6$H$_4$OS)P — O — CH$_3$]
Compound IV phenyl thiocatechol (cyclic) phosphite
    [(C$_6$H$_4$OS)P — O — C$_6$H$_5$]

For each of the tests against E. coli, P. p., S. aureus, and X. p., the "Boyce Thompson" procedure was employed, in which the compound rate is expressed in parts of the compound per million. The results are listed as scale of 0 to 3, where zero indicates no growth of bacteria and 3 indicates heavy growth.

The Mexican Bean Beetle Test was as follows. Primary leaves of lima beam plants are excised and dipped into solutions containing the chemicals. The leaves are allowed to dry by placing the petiole in water using 50 ml. flasks. After they are dry, they are transferred to paper cups inserting the petiole through a small hole at the bottom of the cup. The petiole is then kept immersed in water to prevent wilting of the treated leaf. The cup serves then as a chamber for the leaf, into which 5 larvae (fourth instar) of the Mexican Bean Beetle (*Epilachna yarivestis* Muls.) are inserted. The cup is covered with a Petri plate top to prevent escape of the insects. Primary tests are made at 1,000 p.p.m., and the chemicals formulated as for the aphid test using 5 ml. acetone and 0.01 percent Triton X-155. Mortality of the larvae is recorded after 48 hours.

Sevin is used as standard insecticide for the test.

For the spray test (insecticides), 10-day-old Nasturtium plants are infested with black bean aphids. (*Aphis fabae* Scop.) so that the two first leaves have from 50 to 100 aphids. The infested plants are then sprayed on a turntable with 100 ml. of the chemical solution. Primary tests are made at 1,000 p.p.m. (0.1 g. dissolved in 5 ml. acetone emulsified with 95 ml. 0.01 percent Triton X-155). Each plant is then caged in a Plexiglas piece of tubing supported by a thin aluminum plate and filter paper. The inside of the tube is coated with talcum powder to prevent escape of the aphids. Mortality is then recorded by counting the number of dead aphids and percent mortality determined from the total number. Malathion or Zectran is used as standard fungicide.

The results for each respective rate of the particular compound against each of several particular and separate bacteria and insects are illustrated in Table III.

TABLE III

| | S. a. | | | | E. c. | | | | P. p. | | | | X. p. | | | | MBB | A. c. | A. s. |
|---|---|---|---|---|---|---|---|---|---|---|---|---|---|---|---|---|---|---|---|
| Rate | 255 | 76 | 38 | 19 | 255 | 76 | 38 | 19 | 255 | 76 | 38 | 19 | 255 | 76 | 38 | 19 | 1,000 | 1,000 | 1,000 |
| Compound employed (below) | | | | | | | | Results obtained per rate (below) | | | | | | | | | | | |
| I | 0 | 0 | 3 | 3 | 0 | 3 | 3 | 3 | 0 | 2 | 3 | 3 | 0 | 3 | 3 | 3 | 40 | 31 | 64 |
| II | 0 | 0 | 0 | 3 | 0 | 1 | 3 | 3 | 0 | 0 | 2 | 3 | 0 | 0 | 0 | 3 | | | |
| III | 0 | 0 | 0 | 0 | 0 | 0 | 0 | 3 | 0 | 0 | 0 | 2 | 0 | 0 | 0 | 0 | | | 44 |
| IV | 0 | 0 | 0 | 0 | 0 | 0 | 1 | 3 | 0 | 0 | 0 | 2 | 0 | 0 | 1 | 3 | | | |

TABLE II

| | |
|---|---|
| E. c. | *Escherichia coli* |
| P. p. | *Pseudomonas phaseolicola* |
| S. a. | *Staphylococcus aureus* |
| X. p. | *Xanthomonas phascoli* |
| A. c. | *Aphis fabae* Scop. — contact |
| A. s. | *Aphis fabae* Scop. — systemic |
| MBB | *Epilachna varivestis* Muls. |

Compound I 4,5-benzo-2-ethoxy-2-thio-1-oxa-3-thia-2-phospholane

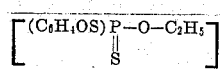

From Table III, it is illustrated: (1) that Compound I exhibits some insecticidal properties (MBB, and A.c.), and slight bactericidal properties; (2) that Compound II exhibits relatively good bactericidal properties; (3) that Compound III exhibits good bacterial properties, and some insecticidal properties; and (4) that the Compound IV exhibits good bactericidal properties.

It is to be understood that the specification, including the Examples, are only illustrative of the invention claimed herein and that it is within the scope of this invention to employ equivalence obvious to one skilled in the art. Any limitations appearing in the preceding disclosure are not intended to limit this invention except insofar as the limitations are stated to be important or otherwise appear in the amended claims.

What is claimed is:

1. A compound of the formula:

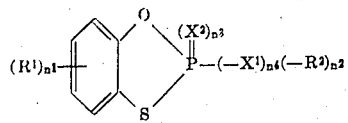

wherein $X^1$ is selected from the group consisting of oxygen, sulfur and nitrogen; $X^2$ is oxygen or sulfur; $R^1$ is an alkyl group of from one to 12 carbon atoms, and $R^2$ is selected from the group consisting of $C_1$–$C_{12}$ alkyl substituted by aryl and aryl mono or di substituted by $C_1$–$C_{12}$ alkyl or phenyl-$C_1$–$C_4$ alkyl, wherein aryl is phenyl or naphthyl $n^1$ is zero to two; $n^3$ is zero or one; $n^4$ is zero or one; $n^2$ is the valence of $X^1$ minus one when $n^4$ is 1; when $n^4$ is zero, $n^2$ is 1.

2. The compound of claim 1 wherein $X^1$ is sulfur.
3. The compound of claim 1 wherein $X^1$ is oxygen.
4. The compound of claim 1 wherein $X^1$ is nitrogen.
5. The compound of claim 1 wherein $n^1$ is zero.
6. The compound of claim 1 wherein $n^1$ is two.
7. The compound of claim 1 wherein $X^2$ is sulfur.
8. The compound of claim 1 wherein $X^2$ is oxygen.
9. The compound of claim 1 wherein $R^2$ is alkyl of up to 12 carbon atoms.
10. The compound of claim 1 wherein $R^2$ is phenyl.
11. The compound of claim 1 wherein $R^2$ is phenyl substituted by alkyl of up to 12 carbon atoms.
12. The compound of claim 1 wherein $R^2$ is phenyl substituted by alkyl of one to four carbon atoms substituted by phenyl.
13. The compound of claim 1 wherein $R^2$ is a disubstituted phenyl and the substituents are lower alkyl.
14. The compound of claim 1 wherein $n^4$ is zero and $R^2$ is alkyl of up to 12 carbon atoms.
15. The compound of claim 1 wherein $n^4$ is zero and $R^2$ is phenyl.
16. The compound of claim 1 wherein $n^4$ is zero and $R^2$ is phenyl substituted alkyl of one to four carbon atoms substituted by phenyl.
17. The compound of claim 1 of the formula

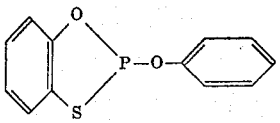

18. The compound of claim 1 of the formula:

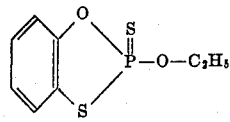

19. The compound of claim 1 of the formula:

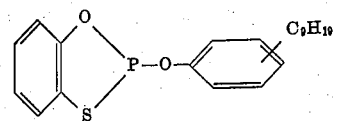

20. The compound of claim 1 of the formula:

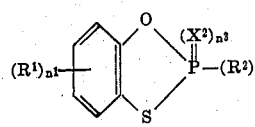

wherein $n^1$, $n^3$ $R^1$ $R^2$ and $X^2$ are as defined in claim 1.

21. The compound of claim 1 of the formula:

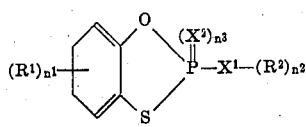

wherein $n^2$ is equal to the valence of $X^1$ minus one; and $n^1$, $n^3$, $R^1$, $R^2$, $X^1$ and $X^2$ are as defined in claim 1.

* * * * *

UNITED STATES PATENT OFFICE
CERTIFICATE OF CORRECTION

Patent No. 3,773,711          Dated November 20, 1973

Inventor(s) James L. Dever et al.

It is certified that error appears in the above-identified patent and that said Letters Patent are hereby corrected as shown below:

Column 13, line 17, rewrite the line to read -- selected from the group consisting of $C_1$-$C_{12}$ alkyl, $C_1$-$C_{12}$ alkyl sub- --;

Column 13, line 18, rewrite the line to read -- stituted by aryl, aryl and aryl mono or di substituted by --.

Signed and sealed this 17th day of September 1974.

(SEAL)
Attest:

McCOY M. GIBSON JR.
Attesting Officer

C. MARSHALL DANN
Commissioner of Patents